United States Patent
Beck et al.

(10) Patent No.: US 10,406,907 B2
(45) Date of Patent: Sep. 10, 2019

(54) TRANSMISSION FOR A MOTOR VEHICLE AND HYBRID DRIVETRAIN PROVIDED THEREWITH

(71) Applicant: ZF Friedrichshafen AG, Friedrichshafen (DE)

(72) Inventors: Stefan Beck, Eriskirch (DE); Martin Brehmer, Tettnang (DE); Matthias Horn, Tettnang (DE); Johannes Kaltenbach, Friedrichshafen (DE); Julian King, Rankweil (AT); Bernd Knöpke, Salem (DE); Jens Moraw, Friedrichshafen (DE); Eckehard Münch, Bünde (DE); Gerhard Niederbrucker, Friedrichshafen (DE); Juri Pawlakowitsch, Kressbronn (DE); Stephan Scharr, Friedrichshafen (DE); Viktor Warth, Friedrichshafen (DE); Michael Wechs, Weißensberg (DE); Peter Ziemer, Tettnang (DE); Uwe Griesmeier, Markdorf (DE); Raffael Kuberczyk, Ravensburg (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 12 days.

(21) Appl. No.: 15/574,343

(22) PCT Filed: Apr. 19, 2016

(86) PCT No.: PCT/EP2016/058592
§ 371 (c)(1),
(2) Date: Nov. 15, 2017

(87) PCT Pub. No.: WO2016/184628
PCT Pub. Date: Nov. 24, 2016

(65) Prior Publication Data
US 2018/0134139 A1 May 17, 2018

(30) Foreign Application Priority Data
May 19, 2015 (DE) ........................ 10 2015 209 144

(51) Int. Cl.
*B60K 6/365* (2007.10)
*B60K 6/48* (2007.10)
(Continued)

(52) U.S. Cl.
CPC ............... *B60K 6/365* (2013.01); *B60K 6/48* (2013.01); *B60K 6/547* (2013.01); *F16H 3/66* (2013.01);
(Continued)

(58) Field of Classification Search
CPC ....... F16H 2200/006; F16H 2200/0065; F16H 2200/0069; F16H 2200/0073;
(Continued)

(56) References Cited

U.S. PATENT DOCUMENTS 7,396,305 B2 * 7/2008 Raghavan ............... B60K 6/40
475/5
7,452,296 B2 * 11/2008 Bucknor ............... B60K 6/365
475/5
(Continued)

FOREIGN PATENT DOCUMENTS

DE 10213820 A1 10/2002
DE 102012219733 A1 4/2014
(Continued)

OTHER PUBLICATIONS

International Search Report (English Translation) PCT/EP2016/058592, dated Jun. 16, 2016. (3 pages).

*Primary Examiner* — Charles A Fox
*Assistant Examiner* — James J Taylor, II
(74) *Attorney, Agent, or Firm* — Dority & Manning, P.A.

(57) ABSTRACT

A transmission (G) for a motor vehicle including an input shaft (GW1), an output shaft (GW2), three planetary gear (Continued)

sets (P1, P2, P3) with three elements each, and five shift elements (B1, K1, K2, K3, K4). The third planetary gear set (P3) has first and second couplings (V1, V2), wherein the first coupling (V1) is between the first elements (E12, E13) of the second and third planetary gear sets (P2, P3), the second coupling (V2) is between the third element (E33) of the third planetary gear set (P3) and the output shaft (GW2), and the second element (E23) of the third planetary gear set (P3) is permanently connected to the input shaft (GW1). One of the first and second couplings (V1, V2) is a permanently rotationally conjoint connection and the other one of the first and second couplings (V1, V2) is a connection selectable by the third shift element (K2).

14 Claims, 7 Drawing Sheets

(51) Int. Cl.
*B60K 6/547* (2007.10)
*F16H 3/66* (2006.01)
*F16H 3/72* (2006.01)

(52) U.S. Cl.
CPC ...... *F16H 3/724* (2013.01); *B60K 2006/4816* (2013.01); *B60Y 2200/92* (2013.01); *F16H 3/666* (2013.01); *F16H 2200/006* (2013.01); *F16H 2200/201* (2013.01); *F16H 2200/2043* (2013.01); *F16H 2200/2064* (2013.01); *F16H 2200/2094* (2013.01); *F16H 2200/2097* (2013.01); *Y02T 10/6221* (2013.01); *Y02T 10/6256* (2013.01); *Y10S 903/911* (2013.01); *Y10S 903/919* (2013.01)

(58) Field of Classification Search
CPC ....... F16H 2200/0078; F16H 2200/201; F16H 2200/2012; F16H 2200/2015; F16H 2200/2017; F16H 2200/2043; F16H 2200/2046; F16H 2200/2048; F16H 2200/2051; F16H 2200/2053; F16H 2200/2056; F16H 2200/2058; F16H 2200/2061; F16H 2200/2097; F16H 2200/0021; F16H 3/72; F16H 2057/02034; B60K 6/36; B60K 6/365; B60K 6/42; B60K 6/44; B60K 6/442; B60K 6/448; B60K 6/46; B60K 6/48; B60K 6/485; B60K 2006/4808; B60K 2006/4816; B60K 2006/4825; B60K 2006/4833; B60K 2006/4841; Y10S 903/909; Y10S 903/91; Y10S 903/911; Y10S 903/917; Y10S 903/919; Y02T 10/6247; Y02T 10/6252; Y02T 10/6256
See application file for complete search history.

(56) References Cited

U.S. PATENT DOCUMENTS

| | | |
|---|---|---|
| 2002/0142880 A1 | 10/2002 | Hayabuchi et al. |
| 2006/0189427 A1 | 8/2006 | Raghavan et al. |
| 2007/0219036 A1 | 9/2007 | Bucknor et al. |

FOREIGN PATENT DOCUMENTS

| | | |
|---|---|---|
| DE | 102012025369 A1 | 7/2014 |
| WO | WO 2014/102030 A1 | 7/2014 |

\* cited by examiner

TRANSMISSION FOR A MOTOR VEHICLE AND HYBRID DRIVETRAIN PROVIDED THEREWITH

FIELD OF THE INVENTION

The invention generally relates to a transmission for a motor vehicle having an input shaft, an output shaft, three planetary gear sets and at least five shift elements. The invention also relates to a hybrid drivetrain for a motor vehicle.

BACKGROUND

An automatic transmission for a vehicle is known from FIG. 7 of the publication DE 102 13 820 A1. However, said automatic transmission does not have an electric machine.

In the prior art, it is known for an existing automatic transmission to be supplemented by an electric machine in order to permit purely electric or hybrid driving operation of a motor vehicle by the automatic transmission. Normally, a rotor of the electric machine is rotationally fixedly connected to the input shaft for this purpose. The rotor may however also be connected to a shaft of the automatic transmission which is neither the input nor the output shaft. By way of example, reference is made in this regard to the applicant's publication DE 10 2007 005 438 A1. However, according to the teaching of said publication, the electric machine cannot output or receive power in all gear ratios of said automatic transmission, because said electric machine is arranged on the same shaft as a brake of the automatic transmission.

It is also known for the electric machine to be connected to an existing automatic transmission by a fixed upstream transmission ratio with respect to the input shaft. By way of example, reference is made in this regard to the applicant's publication DE 10 2008 040 498 A1, in which a hybrid module with a transmission ratio stage is provided which is connected upstream of the automatic transmission itself. Through the fixed upstream transmission ratio, the electric machine is configurable for higher rotational speeds and lower torque, whereby the electric machine has a small structural space requirement. However, the automatic transmission according to the prior art requires an additional planetary gear set for this purpose, whereby the effort for constructing the automatic transmission is increased.

SUMMARY OF THE INVENTION

A transmission refers particularly to a multi-ratio transmission in which a multiplicity of gear ratios, that is to say transmission ratios, between the input shaft and the output shaft are selectable, preferably automatically, by shift elements. The shift elements are in this case, for example, clutches or brakes. Such transmissions are used particularly in motor vehicles for the purposes of suitably adapting the rotational speed and torque output characteristics of the drive unit to the driving resistances of the vehicle.

Therefore, the object of the invention is to provide a transmission for a motor vehicle, the transmission having an integral electric machine with upstream transmission ratio for providing hybrid-typical functionalities in all gear ratios without unduly increasing the effort in terms of construction. Furthermore, the transmission should have a simple and compact design and a high level of mechanical efficiency.

The transmission has three planetary gear sets and at least five shift elements, the selective engagement of which realizes at least eight selectable forward gear ratios between an input shaft and an output shaft of the transmission.

A planetary gear set includes a sun gear, a carrier and a ring gear. Rotatably mounted on the carrier are planetary gears which mesh with the toothing of the sun gear and/or with the toothing of the ring gear. A minus or negative gear set refers to a planetary gear set with a carrier on which the planetary gears are rotatably mounted, having a sun gear and having a ring gear, wherein the toothing of at least one of the planetary gears meshes both with the toothing of the sun gear and with the toothing of the ring gear, whereby the ring gear and the sun gear rotate in opposite directions of rotation when the sun gear rotates in the presence of a static carrier. A plus or positive gear set differs from the minus planetary gear set described directly above in that the plus gear set has inner and outer planetary gears which are mounted rotatably on the carrier. The toothing of the inner planetary gears meshes, in this case, at one side with the toothing of the sun gear and at the other side with the toothing of the outer planetary gears. The toothing of the outer planetary gears furthermore meshes with the toothing of the ring gear. This has the result that, in the presence of a static carrier, the ring gear and the sun gear rotate in the same direction of rotation.

The first, second and third planetary gear sets each have a first, second and third element. The first element is a sun gear of the respective planetary gear set. If the planetary gear set is a minus gear set, the second element is a carrier of the planetary gear set, and the third element is a ring gear of the planetary gear set. If the planetary gear set is a plus gear set, the second element is the ring gear of the planetary gear set, and the third element is the carrier of the planetary gear set.

The first element of the first planetary gear set is permanently rotationally fixedly immobilized. The second element of the first planetary gear set is permanently connected to the input shaft. The second element of the second planetary gear set is permanently connected to the output shaft.

The third element of the second planetary gear set is rotationally fixedly immobilizable by closing the first shift element, in that the third element of the second planetary gear set is connected rotationally fixedly to a housing of the transmission or to some other rotationally fixed component of the transmission. A rotationally conjoint connection between the third element of the first planetary gear set and the first element of the second planetary gear set is produced by closing the fourth shift element. A rotationally conjoint connection between the third element of the first planetary gear set and the third element of the second planetary gear set is produced by closing the fifth shift element.

The third planetary gear set has a first coupling and a second coupling in addition to the connection of its second element to the input shaft. The first coupling exists between the first element of the third planetary gear set and the first element of the second planetary gear set. The second coupling exists between the third element of the third planetary gear set and the output shaft.

According to the invention, the second element of the third planetary gear set is permanently connected to the input shaft. One of the two couplings is a permanently rotationally conjoint connection, and the remaining coupling is a selectable connection. The shift element in the selectable connection is the third shift element. A transmission of torque between the three elements of the third planetary gear set is made possible by closing the third shift element. Thus, in the open state of the third shift element, no power is transmittable between the first, second and third elements of the third planetary gear set, wherein small power losses for example owing to friction are negligible. If the first coupling is a permanently rotationally conjoint connection, a rotationally conjoint connection is produced between two of the first, second and third elements of the third planetary gear set, that is to say two of the sun gear, carrier and ring gear of the third planetary gear set, by closing the second shift element. If the second coupling is a permanently rotationally conjoint connection, a rotationally conjoint connection between the input shaft and the first element of the second planetary gear set is produced by closing the second shift element.

Furthermore, the third element of the first planetary gear set is permanently rotationally conjointly connected to a rotor of an electric machine.

Since the first element of the first planetary gear set is permanently rotationally fixedly immobilized and the second element of the first planetary gear set is permanently connected to the input shaft, there is a fixed transmission ratio between the input shaft and the third element of the first planetary gear set regardless of gear ratio. In any gear ratio, the rotor of the electric machine rotates at a higher rotational speed than the input shaft. Thus, the electric machine is configurable for higher rotational speeds and lower torque, whereby the electric machine is smaller and less expensive to produce. Furthermore, the first planetary gear set is involved in the formation of the gear ratios. Thus, no additional planetary gear set is required for forming the upstream transmission ratio for the electric machine. Furthermore, the third element of the first planetary gear set has a rotational speed in all gear ratios. The transmission therefore makes it possible for power to be output and to be received by the electric machine in all gear ratios.

At least eight forward gear ratios between the input shaft and the output shaft are selectable in automated fashion through selective actuation of the first to fifth shift elements. A first forward gear ratio of the least eight forward gear ratios is realized by closing the first shift element and the second shift element. A second forward gear ratio of the least eight forward gear ratios is realized by closing the first shift element and the fourth shift element. A third forward gear ratio of the least eight forward gear ratios is realized by closing the first shift element and the third shift element. A fourth forward gear ratio of the least eight forward gear ratios is realized by closing the third shift element and the fourth shift element. A fifth forward gear ratio of the least eight forward gear ratios is realized by closing the second shift element and the third shift element. A sixth forward gear ratio of the least eight forward gear ratios is realized by closing the third shift element and the fifth shift element. A seventh forward gear ratio of the least eight forward gear ratios is realized by closing the second shift element and the fifth shift element. An eighth forward gear ratio of the least eight forward gear ratios is realized by closing the fourth shift element and the fifth shift element. Through this assignment of the first to fifth shift elements to the individual forward gear ratios of the least eight forward gear ratios, a transmission ratio series well-suited to use in the motor vehicle is achieved with suitable selection of the carrier transmission ratio of the planetary gear sets. Furthermore, two adjacent gear ratios of the least eight forward gear ratios always have a shift element which is closed in both of said gear ratios. Therefore, during a shift process into an adjacent gear ratio, it is merely necessary for one shift element to be opened and one shift element to be closed. This simplifies the shift process and shortens the shift duration.

The first shift element is preferably a positively locking shift element. Positively locking shift elements produce the connection in the closed state by positive locking, and are characterized by lower drag losses in the open state than frictionally locking shift elements. For example, the first shift element may be a dog-clutch shift element, which may also be formed without a synchronizing device. Owing to the low drag losses in the open state, the efficiency of the transmission is further improved, in particular because the first shift element is closed only in the first to third forward gear ratios of the motor vehicle. The first shift element is therefore predominantly open during the operation of the transmission in the motor vehicle. Since the first shift element is closed only in the first to third forward gear ratios, the shift element is always opened, and not closed, during shift processes into a higher gear ratio. An opening of a dog-clutch shift element is considerably more straightforward than the closing process, because the claws of the dog-clutch shift element must firstly engage into the gaps provided for them in the case of closing, whereas the claws merely have to be placed into a load-free state in the case of opening. Both processes require time, wherein, in particular in the case of shift processes from a low gear into a higher gear ratio, the shift time should be as short as possible for the sake of driving dynamics. Since the first shift element must, however, never be closed but only be open during shift processes into a higher gear ratio, the first shift element being a positively locking shift element does not give rise to any limitation with regard to the shift duration.

According to one refinement, the transmission has, at one axial end, a connecting shaft which is connectable by a sixth shift element to the input shaft. The sixth shift element can uncouple a drive unit, connected to the connecting shaft, from the drive shaft of the transmission, for example if the motor vehicle is driven purely by the electric machine of the transmission. The connecting shaft and output shaft are arranged coaxially with respect one another and at opposite ends of the transmission. The transmission is therefore a "front-mounted longitudinal transmission" for a motor vehicle. The planetary gear sets are arranged in the following axial sequence proceeding from the one axial end of the transmission to which the connecting shaft is assigned: first planetary gear set, second planetary gear set, third planetary gear set. This permits a compact design of the transmission.

According to an alternative refinement, the transmission likewise has the sixth shift element by which the input shaft is connectable to the connecting shaft, wherein, proceeding from the one axial end of the transmission which is assigned to the connecting shaft, the planetary gear sets are arranged in the following axial sequence: third planetary gear set, second planetary gear set, first planetary gear set. This refinement is particularly suitable for a "front-mounted transverse transmission" for a motor vehicle, wherein the output shaft has a toothing arrangement which meshes with a toothing arrangement of a shaft which is axis-parallel with respect to the input shaft. The power of the output shaft is transmitted to the wheels of the motor vehicle via this axis-parallel shaft.

According to an embodiment, the sixth shift element is a positively locking shift element. As result, the efficiency of the transmission can be improved, since the sixth shift element generates significantly lower drag losses in the opened state than a frictionally locking shift element such as, for example, a multi-plate clutch.

According to one alternative embodiment, the sixth shift element is a frictionally locking shift element with variable torque transfer capability, for example a dry or wet multi-plate clutch. A multi-plate clutch is composed of an inner plate support and an outer plate support, wherein a multiplicity of inner plates is connected to the inner plate support, and a multiplicity of outer plates is connected to the outer plate support. The inner plates and outer plates are arranged alternately and overlap one another. If a force is applied to the plates perpendicularly with respect to the plate surface of the plates, a torque is transmitted from one plate support to the other plate support by friction between the inner plates and outer plates. The torque which is transmitted from one plate support to the other plate support depends on the force applied. If the force is large enough to prevent a differential rotational speed between the inner plates and outer plates through frictional locking, the entire torque is transmitted. If the force is not sufficient for this, only part of the torque is transmitted, wherein a differential rotational speed occurs between the inner plates and outer plates. This state is also referred to as slipping operation. The torque transmission capability of the sixth shift element is adjustable by varying the force applied to the plates.

According to one refinement of the transmission in which the first coupling is a permanently rotationally conjoint connection, and the first element of the third planetary gear set is connectable to the second element of the third planetary gear set by closing the second shift element, the second shift element is preferably arranged at least partially radially within the fourth shift element. This results in a transmission which is particularly compact in the axial direction.

According to one refinement of the transmission in which the first coupling is a permanently rotationally conjoint connection, and the second element of the third planetary gear set is connectable to the third element of the third planetary gear set by closing the second shift element, the second shift element is preferably arranged axially spatially between the third planetary gear set and that axial end of the transmission which faces toward the output shaft. As a result it becomes possible to construct the second and third planetary gear sets axially closely to one another, which makes the first coupling particularly short. This reduces the overall axial length of the transmission and also its weight, since the sun gears of the first and second planetary gear sets are preferably manufactured in one piece.

According to one refinement of the transmission in which the first coupling is a permanently rotationally conjoint connection, and the first element of the third planetary gear set is connectable to the third element of the third planetary gear set by closing the second shift element, the second shift element is preferably arranged axially spatially between the second planetary gear set and the third planetary gear set.

According to one refinement of the transmission in which the second coupling is a permanently rotationally conjoint connection, the second shift element is preferably arranged at least partially radially within the fourth shift element. This results in a transmission which is particularly compact in the axial direction.

The transmission can be a component of a hybrid drivetrain of a motor vehicle. The hybrid drivetrain also has, in addition to the transmission, an internal combustion engine which is connected to the connecting shaft of the transmission. The output shaft of the transmission is connected to an output which is connected to wheels of the motor vehicle. The hybrid drivetrain makes a plurality of drive modes of the motor vehicle possible. In an electric driving mode, the motor vehicle is driven by the electric machine of the transmission, wherein the sixth shift element is opened. In an internal combustion engine mode, the motor vehicle is driven by the internal combustion engine, wherein the sixth shift element is closed. In a hybrid mode, the motor vehicle is driven both by the internal combustion engine and by the electric machine of the transmission.

The transmission permits a multiplicity of possibilities for making available a starting function of the motor vehicle. In the internal combustion engine mode, the sixth shift element can be a starting element. In the event of a malfunction or of overloading of the sixth shift element, the second element can also be used as a starting element. In the electric driving mode, the electric machine can make available the starting function proceeding from its zero rotational speed with an engaged forward gear.

An electric machine is composed at least of a rotationally fixed stator and a rotatably mounted rotor and in a motor mode it is configured to convert electrical energy into mechanical energy as a rotational speed and torque, and to convert mechanical energy into electrical energy as current and voltage in a generator mode.

The term permanent connection refers to a connection between two elements which exists constantly. Elements which are continuously connected permanently rotate constantly with the same dependence between their rotational speeds. A shift element cannot be located in a permanent connection between two elements. A permanent connection can therefore be differentiated from a shiftable connection.

BRIEF DESCRIPTION OF THE DRAWINGS

Exemplary embodiments of the invention are described in detail below with reference to the accompanying figures. The following is shown.

DETAILED DESCRIPTION

Figure 1:
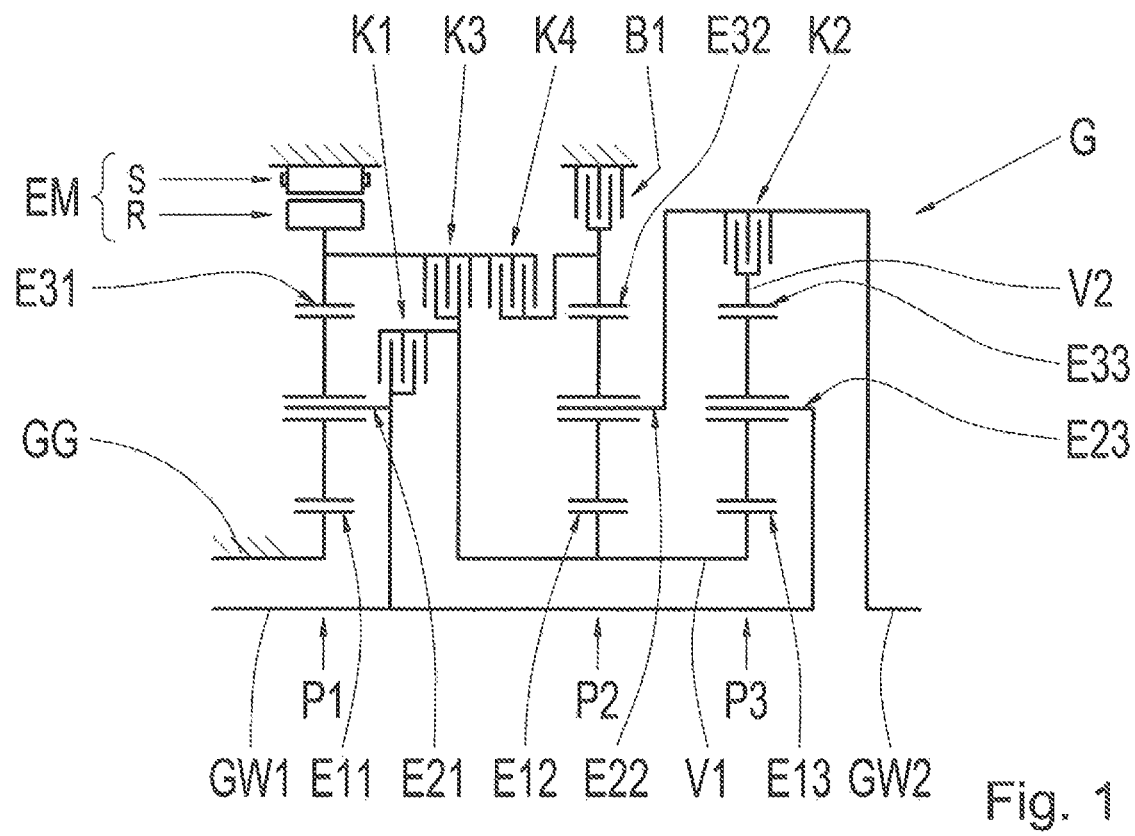
FIG. 1 shows a schematic view of a transmission corresponding to a first exemplary embodiment of the invention.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a schematic view of a transmission G corresponding to a first exemplary embodiment of the invention. The transmission G has an input shaft GW1, an output shaft GW2, a first planetary gear set P1, second planetary gear set P2, a third planetary gear set P3 and an electric machine or motor EM which includes a stator S and a rotor R. First, second and third planetary gear sets P1, E2, P3 are formed as minus gear sets and each have a first element E11, E12, E13, a second element E21, E22, E23 and a third element E31, E32, E33. The first element E11, E12, E13 is a sun gear of the respective planetary gear set P1, P2, P3. The second element E21, E22, E23 is a carrier of the respective planetary gear set P1, P2, P3. The third element E31, E32, E33 is a ring gear of the respective planetary gear set P1, P2, P3.

The first element E11 of the first planetary gear set P1 is immobilized in a permanently rotationally conjoined fashion by being connected to a housing GG or to another rotationally conjoint component. The second element E21 of the first planetary gear set P1 and the second element E23 of the third planetary gear set P3 are permanently connected to the input shaft GW1. The first element E12 of the second planetary gear set P2 is permanently connected to the first element E13 of the third planetary gear set P3, as result of which a first coupling V1 is formed which is a permanently rotationally conjoined connection. The second element E22 of the second planetary gear set P2 is permanently connected to the output shaft GW2. The third element E33 of the third planetary gear set P3 is connected via a second coupling V2 to the output shaft GW2, wherein the third shift element K2 is arranged in this second coupling V2. The third element E31 of the first planetary gear set P1 is permanently connected to the rotor R of the electric machine EM.

The transmission G also has five shift elements B1, K1, K2, K3, K4. The third element E32 of the second planetary gear set P2 is rotationally fixedly immobilizable by closing the first shift element B1 of the five shift elements. The input shaft GW1 is connectable to the first element E12 of the second planetary gear set P2 by closing the second shift element K1 of the five shift elements. Since the first element E12 of the second planetary gear set P2 is permanently connected to the first element E13 of the third planetary gear set P3, and the input shaft GW1 is permanently connected to the second element E23 of the third planetary gear set P3, the first element E13 of the third planetary gear set P3 is connected to the second element E23 of the third planetary gear set P3 by closing the second shift element K1 of the five shift elements. Through such a rotationally conjoint connection of two elements of the same planetary gear set, the latter is blocked, with the result that its sun gear, carrier and ring gear elements rotate at the same rotational speed. The third element E33 of the third planetary gear set P3 is connectable to the output shaft GW2 by closing the third shift element K2 of the five shift elements in the second coupling V2. The third element E31 of the first planetary gear set P1 is connectable to the first element E12 of the second planetary gear set P2 by closing the fourth shift element K3 of the five shift elements. The third element E31 of the first planetary gear set P1 is connectable to the third element E32 of the second planetary gear set P2 by closing the fifth shift element K4 of the five shift elements. The five shift elements B1, K1, K2, K3, K4 are illustrated as plate shift elements. However, this is not to be considered as limiting. A selection of the five shift elements B1, K1, K2, K3, K4 can also be dog-clutch shift elements, particularly the first shift element B1. This applies to all the exemplary embodiments.

The first exemplary embodiment of the transmission G which is illustrated in FIG. 1 is what is referred to as a "front-mounted longitudinal transmission" for a motor vehicle. The input shaft GW1 and output shaft GW2 are correspondingly arranged coaxially with respect to one another and at opposite axial ends of the transmission G. The second shift element K1 is arranged partially radially within the fourth shift element K3. Proceeding from the axial end of the transmission G assigned to the input shaft GW1, the first, second and third planetary gear sets P1, P2, P3 are arranged in the following axial sequence: first planetary gear set P1, second planetary gear set P2, third planetary gear set P3.

Figure 2:
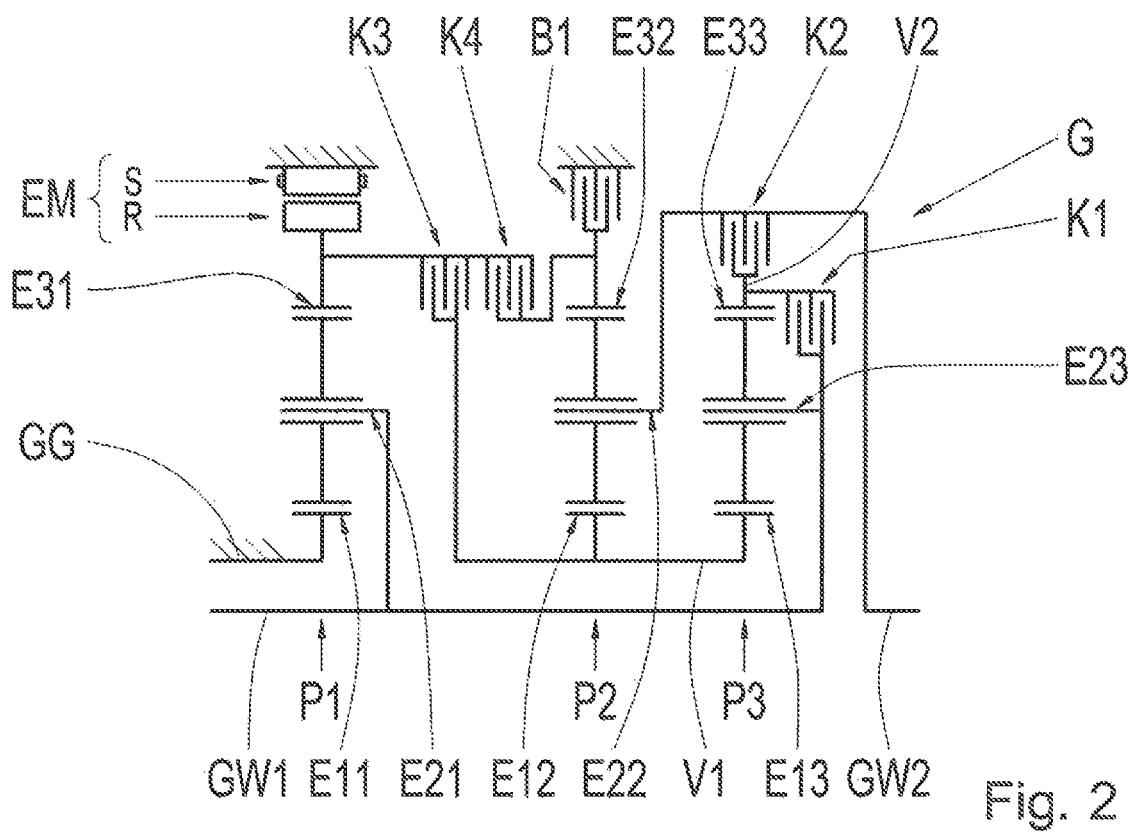
FIG. 2 shows a schematic view of a transmission corresponding to a second exemplary embodiment of the invention.

FIG. 2 shows a schematic view of a transmission G corresponding to a second exemplary embodiment of the invention. In contrast to the first exemplary embodiment illustrated in FIG. 1, the second element E23 of the third planetary gear set P3 is connectable to the third element E33 of the third planetary gear set P3 by closing the second shift element K1. The second shift element K1 is arranged axially spatially between the third planetary gear set P3 and the axial end of the transmission G assigned to the output shaft GW2.

Figure 3:
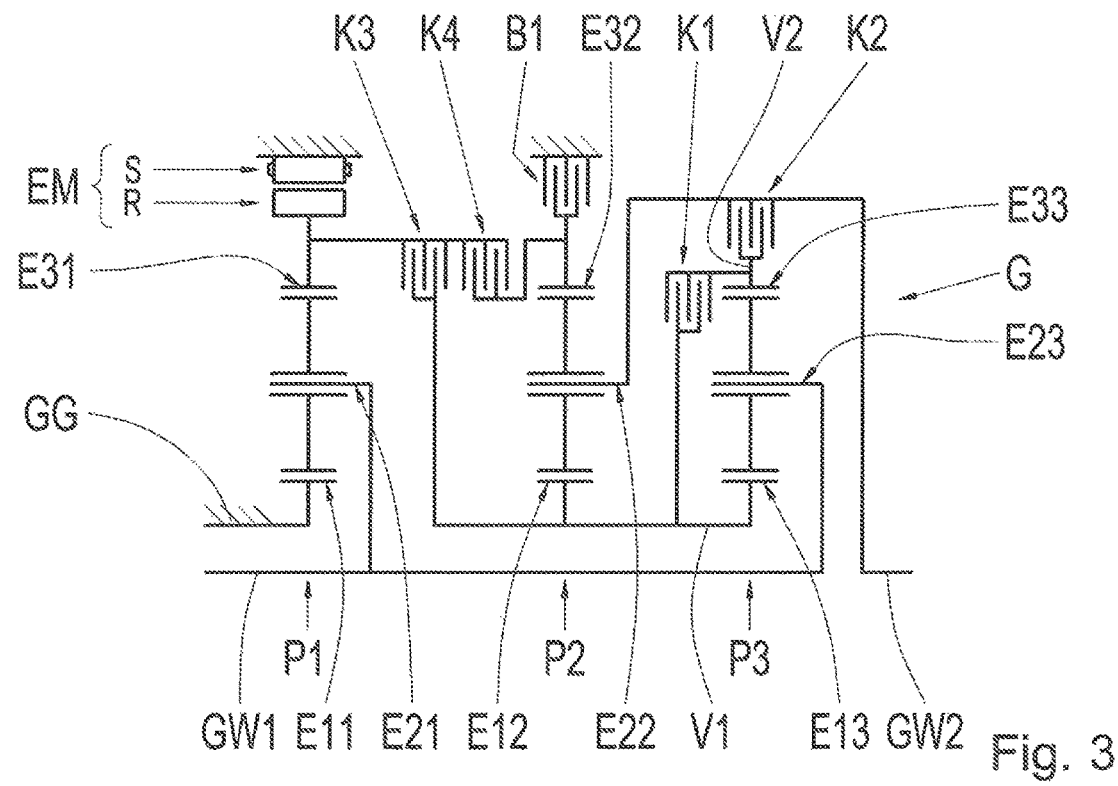
FIG. 3 shows a schematic view of a transmission corresponding to a third exemplary embodiment of the invention.

FIG. 3 shows a schematic view of a transmission G corresponding to a third exemplary moment of the invention. In contrast to the first exemplary embodiment illustrated in FIG. 1, the first element E13 of the third planetary gear set P3 is connectable to the third element E33 of the third planetary gear set P3 by closing the second shift element K1. The second shift element K1 is arranged axially spatially between the second planetary gear set P2 and the third planetary gear set P3.

Figure 4:
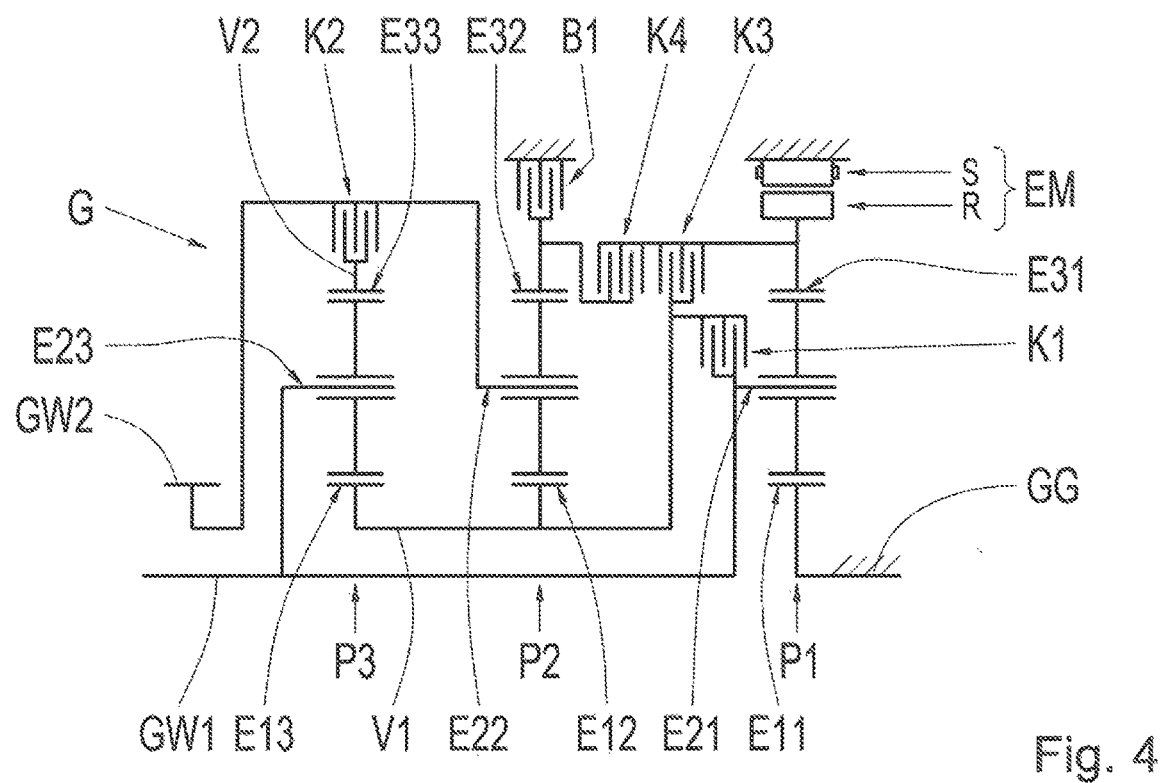
FIG. 4 shows a schematic view of a transmission corresponding to a fourth exemplary embodiment of the invention.

FIG. 4 shows a schematic view of a transmission G corresponding to a fourth exemplary embodiment of the invention. In contrast to the first exemplary embodiment illustrated in FIG. 1, the transmission G is now what is referred to as a "front-mounted transverse transmission" for a motor vehicle. The output shaft GW2 is correspondingly arranged at the same one axial end of the transmission G as the input shaft GW1. The output shaft GW2 has an outer toothing arrangement which meshes with an outer toothing of a shaft (not illustrated) which is arranged axis-parallel with respect to the output shaft GW2. Proceeding from the one axial end of the transmission G, to which both the input shaft GW1 and the output shaft GW2 are assigned, the first, second and third planetary gear sets P1, P2, P3 are arranged in the following axial sequence: third planetary gear set P3, second planetary gear set P2, first planetary gear set P1. The second shift element K1 is arranged partially radially i within the fourth shift element K3.

Figure 5:
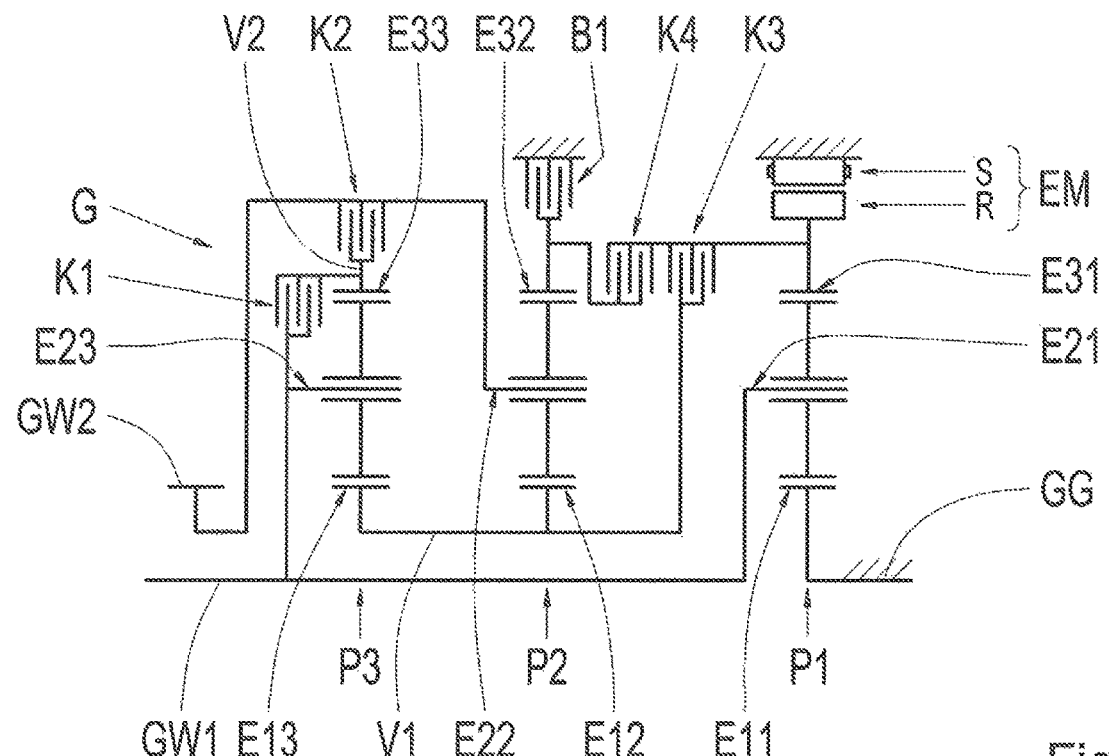
FIG. 5 shows a schematic view of a transmission corresponding to a fifth exemplary embodiment of the invention.

FIG. 5 shows a schematic view of a transmission G corresponding to a fifth exemplary embodiment of the invention, In contrast to the fourth exemplary embodiment illustrated in FIG. 4, the second element E23 of the third planetary gear set P3 is connectable to the third element E33 of the third planetary gear set P3 by closing the second shift element K1. The second shift element K1 is arranged axially in spatial terms between the third planetary gear set P3 and the axial end of the transmission G assigned to the output shaft GW2 and to the input shaft GW1.

Figure 6:
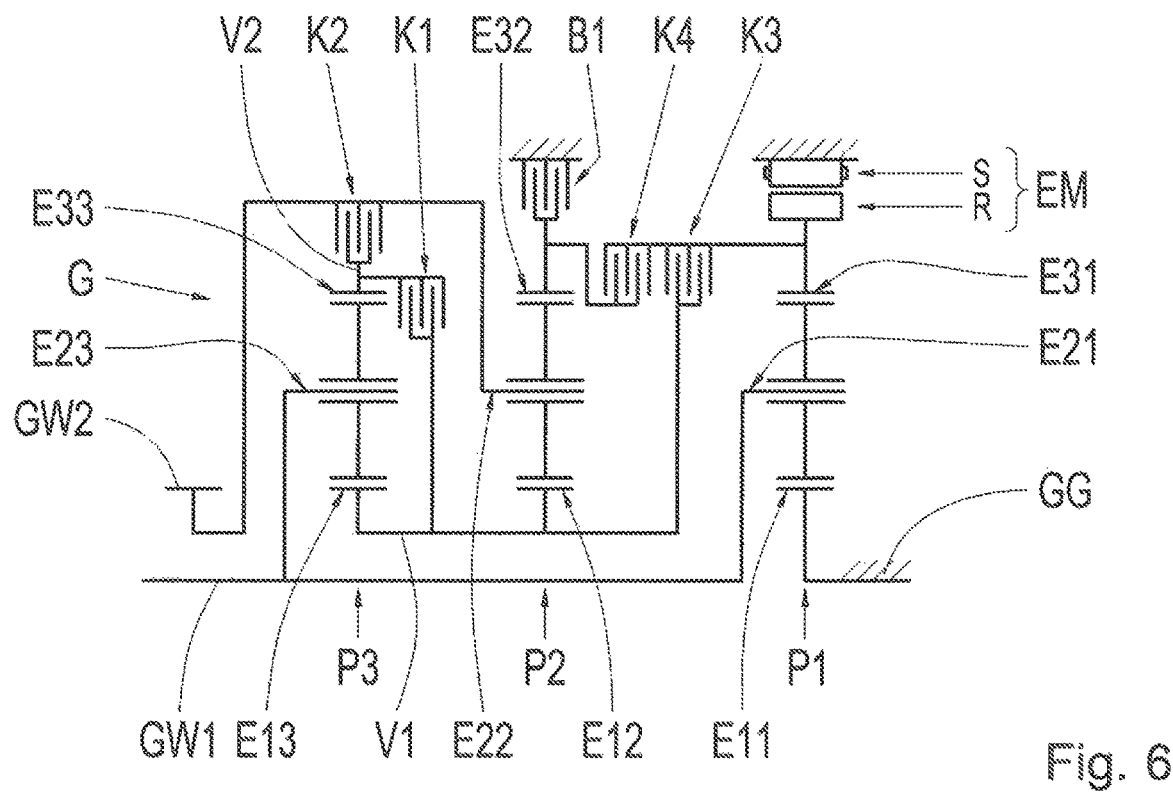
FIG. 6 shows a schematic view of a transmission corresponding to a sixth exemplary embodiment of the invention.

FIG. 6 shows a schematic view of a transmission G corresponding to a sixth exemplary embodiment of the invention, In contrast to the fourth exemplary embodiment illustrated in FIG. 4, the first element E13 of the third planetary gear set P3 is connectable to the third element E33 of the third planetary gear set P3 by closing the second shift element K1. The second shift element K1 is arranged axially spatially between the second planetary gear set P2 and the third planetary gear set P3.

Figure 7:
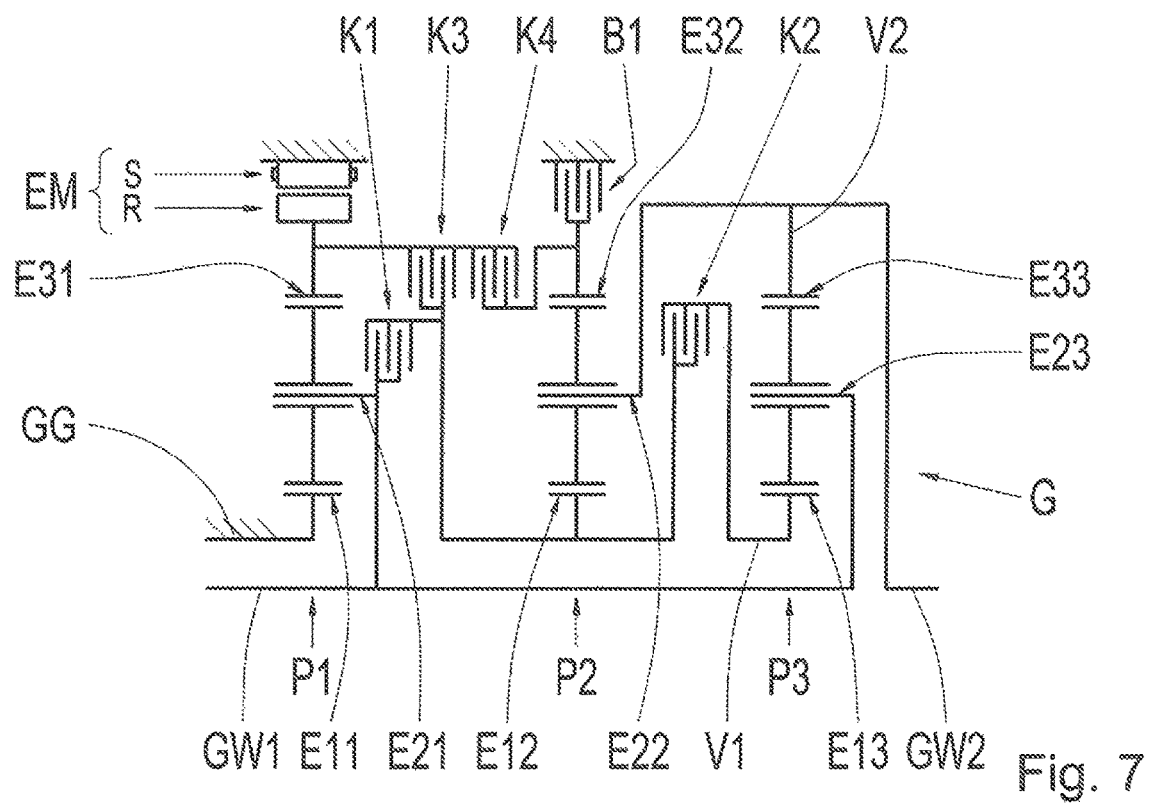
FIG. 7 shows a schematic view of a transmission corresponding to a seventh exemplary embodiment of the invention.

FIG. 7 shows a schematic view of a transmission G corresponding to a seventh exemplary embodiment of the invention. In contrast to the first exemplary embodiment illustrated in FIG. 1, the first coupling V1 is not a permanently rotationally conjoint connection but instead is a connection which is shiftable by the third shift element K2. The second coupling V2 is not a shiftable connection but instead is a permanently rotationally conjoint connection. Therefore, in the transmission G according to the seventh exemplary embodiment, by closing the third shift element K2 a rotationally conjoint connection between the first element E12 of the second planetary gear set P2 and the first element E13 of the third planetary gear set P3 is producible, while the third element E33 of the third planetary gear set P3 is now connected permanently rotationally conjointly to the output shaft GW2. The seventh exemplary embodiment of the transmission G which is illustrated in FIG. 7 is what is referred to as a "front-mounted longitudinal transmission" for a motor vehicle. The input shaft GW1 and output shaft GW2 are correspondingly arranged coaxially with respect to one another and at opposite axial ends of the transmission G. The second shift element K1 is arranged partially radially within the fourth shift element K3. Proceeding from that one axial end of the transmission G assigned to the input shaft GW1, the first, second and third planetary gear sets P1, P2, P3 are arranged in the following axial sequence: first planetary gear set P1, second planetary gear set P2, third planetary gear set P3.

Figure 8:
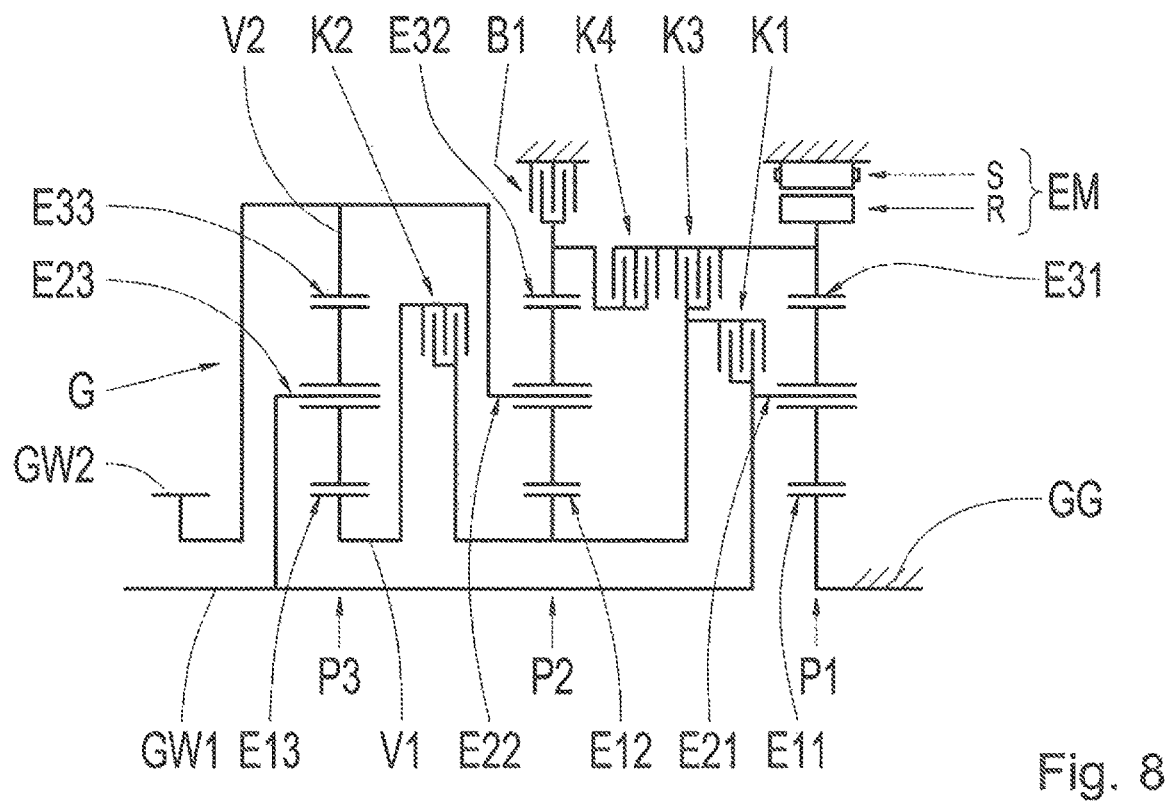
FIG. 8 shows a schematic view of a transmission corresponding to an eighth exemplary embodiment of the invention.

FIG. 8 shows a schematic view of a transmission G corresponding to an eighth exemplary embodiment of the invention. In contrast to the seventh exemplary embodiment illustrated in FIG. 7, the transmission G is what is referred to as a "front-mounted transverse transmission" for a motor vehicle. The output shaft GW2 is correspondingly arranged at the same axial one end of the transmission G as the input shaft GW1.

Figures 9, 10:
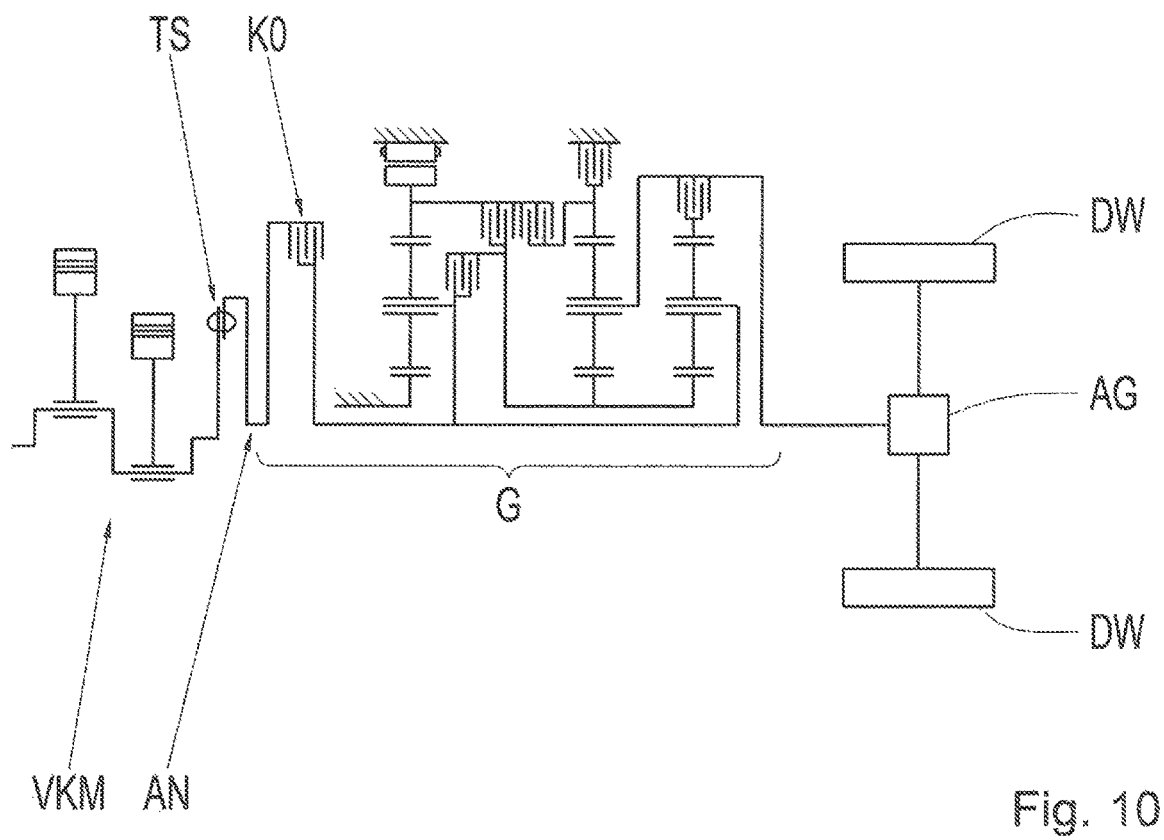
FIG. 9 shows a shift pattern of the transmission.
FIG. 10 shows a hybrid drivetrain of a motor vehicle.

FIG. 9 shows a shift pattern for a transmission G which is usable with any of the exemplary embodiments. The eight forward gears G1 to G8 are specified in the rows of the shift pattern. In the columns of the shift pattern, an "x" represents which of the five shift elements B1, K1, K2, K3, K4 are closed in which forward gear G1 to G8 of the eight forward gears.

In all these improvements, the input shaft GW1 is connectable to a connecting shaft AN via a sixth shift element K0. The sixth shift element K0 is either a frictionally locking shift element with variable torque transfer capability or a positively locking shift element.

Figure 1A:
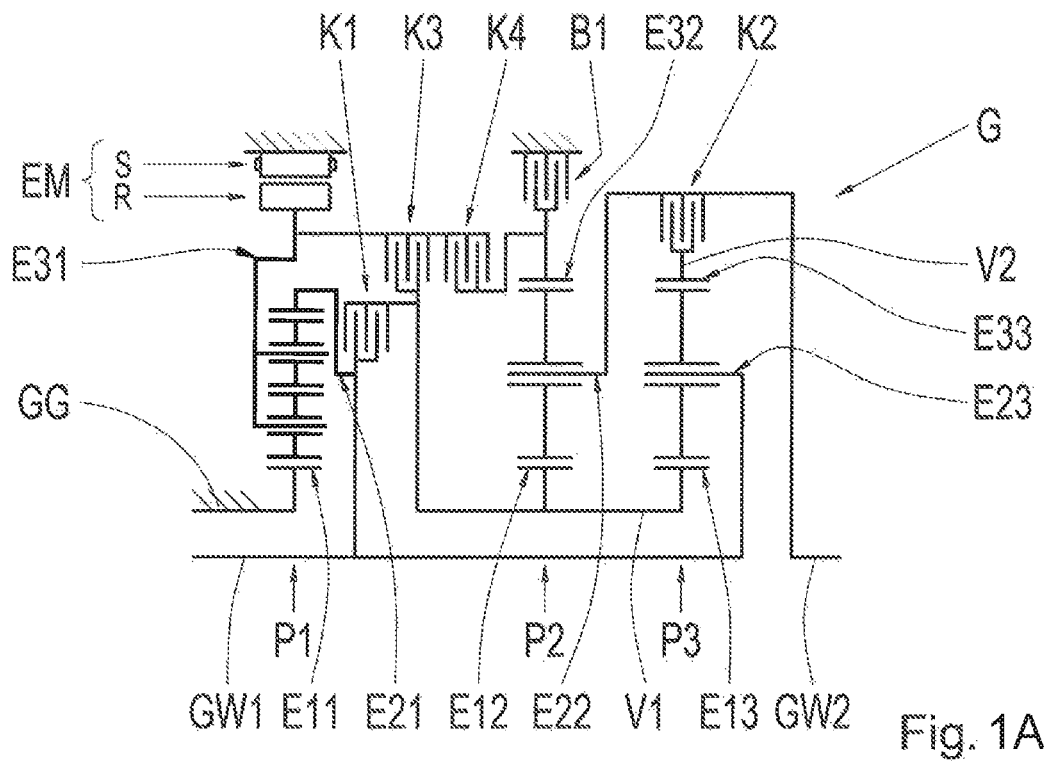
FIG. 1A shows a schematic view of a transmission corresponding to the first exemplary embodiment of the invention in accordance with aspects of the present subject matter, particularly with a first planetary gear set of the transmission being a plus gear set.
Figure 2A:
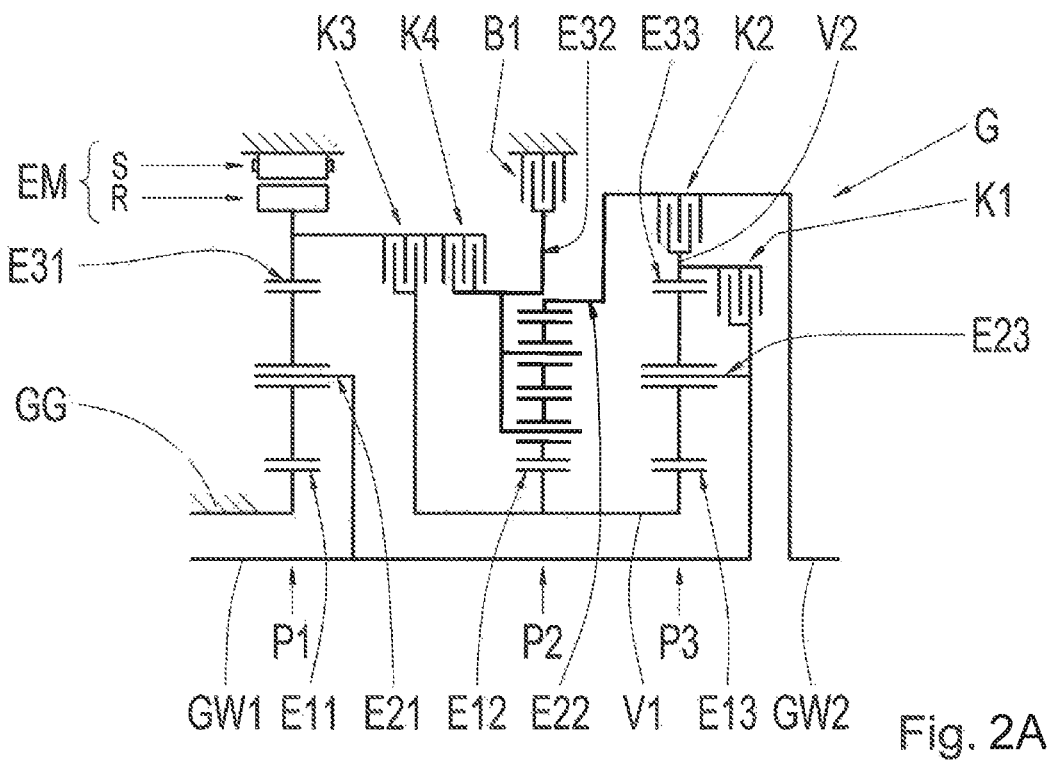
FIG. 2A shows a schematic view of a transmission corresponding to the second exemplary embodiment of the invention in accordance with aspects of the present subject matter, particularly with a second planetary gear set of the transmission being a plus gear set.
Figure 3A:
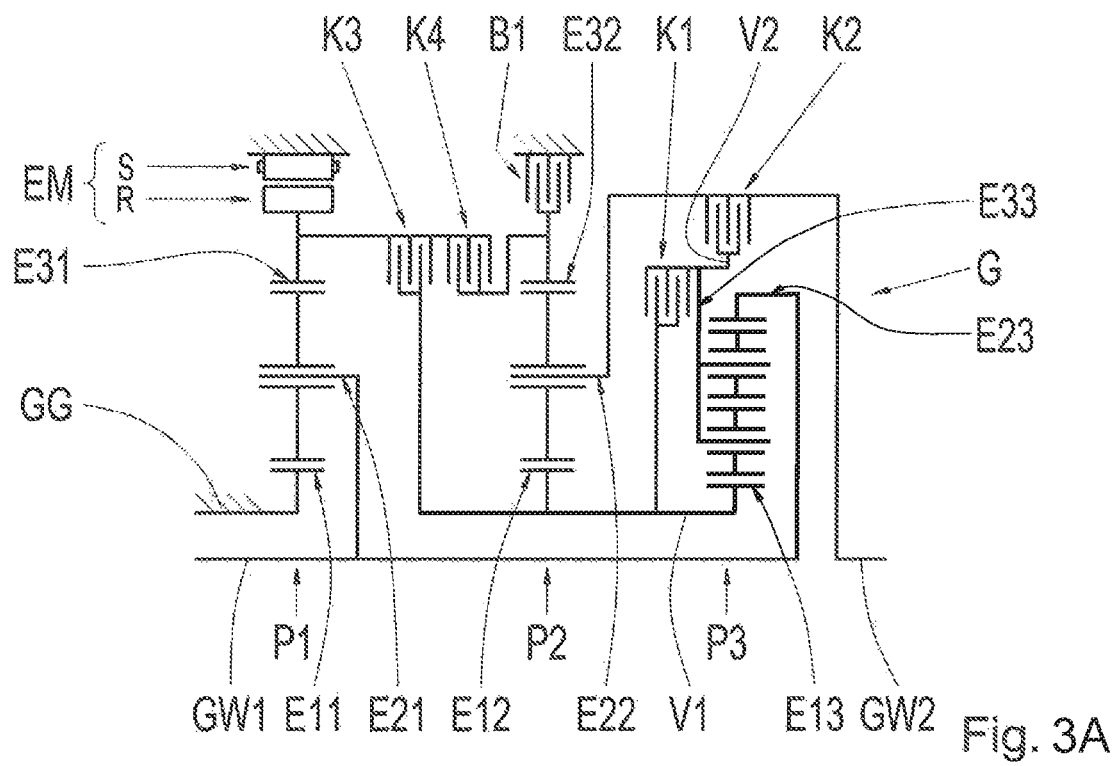
FIG. 3A shows a schematic view of a transmission corresponding to the third exemplary embodiment of the invention in accordance with aspects of the present subject matter, particularly with a third planetary gear set of the transmission being a plus gear set.

The first, second and third planetary gear sets P1, P2, P3 are illustrated as minus gear sets in all the exemplary embodiments. This is to be considered as being merely exemplary. One or more of the first, second and third planetary gear sets P1, P2, P3 can also be a plus gear set. It is to be noted that when a minus gear set is replaced by a plus gear set the connections to the carrier and ring gear of this gear set are to be interchanged. For example, as shown in FIG. 1A, when the first planetary gear set P1 is a plus gear set, the second element E21 of the first planetary gear set P1 is now a ring gear and the third element E31 of the first planetary gear P1 set is now a carrier. Similarly, as shown in FIG. 2A, when the second planetary gear set P2 is a plus gear set, the second element E22 of the second planetary gear set P2 is now a ring gear and the third element E32 of the second planetary gear P2 set is now a carrier. Furthermore, as shown in FIG. 3A, when the third planetary gear set P3 is a plus gear set, the second element E23 of the third planetary gear set P3 is now a ring gear and the third element E33 of the third planetary gear set P3 is now a carrier. Additionally, when a minus gear set is replaced by a plus gear set, the absolute value of the stationary transmission ratio is to be increased by the value one.

FIG. 10 shows a hybrid drivetrain of a motor vehicle having a transmission G according to the first exemplary embodiment. This is to be considered as being merely exemplary. The hybrid drivetrain could be constructed with any of the specified exemplary embodiments of the transmission G. The hybrid drivetrain has an internal combustion engine VKM which is connected to the connecting shaft AN of the transmission G via a torsion vibration damper TS. The connecting shaft AN is connectable to the input shaft GW1 of the transmission G via the sixth shift element K0. The output shaft GW2 has an operative drive connection to an axle-mounted transmission AG. Proceeding from the axle-mounted transmission AG, the power which is present at the output shaft GW2 is distributed to wheels DW of the motor vehicle. In the motor mode of the electric machine EM, electrical power is fed to the stator S via a power inverter (not illustrated). In the generator mode of the electric machine EM, the stator S feeds electric power to the power inverter. The power inverter converts the DC voltage of an energy accumulator (not illustrated) into an AC voltage which is suitable for the electric machine EM, and vice versa.

Modifications and variations can be made to the embodiments illustrated or described herein without departing from the scope and spirit of the invention as set forth in the appended claims.

REFERENCE DESIGNATIONS

G Transmission
GW1 Input shaft
GW2 Output shaft
AN Connecting shaft
GG Housing
P1 First planetary gear set
P2 Second planetary gear set
P3 Third planetary gear set
EM Electric machine
R Rotor
S Stator
E11 First element of the first planetary gear set
E21 Second element of the first planetary gear set
E31 Third element of the first planetary gear set
E12 First element of the second planetary gear set
E22 Second element of the second planetary gear set
E32 Third element of the second planetary gear set
E13 First element of the third planetary gear set
E23 Second element of the third planetary gear set
E13 Third element of the third planetary gear set
V1 First coupling
V2 Second coupling
B1 First shift element
K1 Second shift element
K2 Third shift element K3 Fourth shift element
K4 Fifth shift element
K0 Sixth shift element
G1-G8 First to eighth forward gear ratio
R1 First reverse gear ratio
R2 Second reverse gear ratio
VKM Internal combustion engine
DW Wheels
AG Axle transmission
TS Torsional vibration damper

The invention claimed is:

1. A transmission (G) for a motor vehicle, the transmission comprising:
an input shaft (GW1);
an output shaft (GW2);
a plurality of planetary gear sets with a first, a second and a third planetary gear set (P1, P2, P3);
a plurality of shift elements with a first, a second, a third, a fourth and a fifth shift element (B1, K1, K2, K3, K4), the plurality of shift elements configured such that selective engagement of the plurality of shift elements realizes eight selectable forward gear ratios (G1-G8) between the input shaft (GW1) and the output shaft (GW2),
wherein each of the first, second and third planetary gear sets (P1, P2, P3) is either a minus gear set or a plus gear set,
wherein each of the first, second and third planetary gear sets (P1, P2, P3) has
a first element (E11, E12, E13) that is a sun gear of the respective first, second or third planetary gear set (P1, P2, P3),
a second element (E21, E22, E23) that is a carrier of the respective planetary gear set (P1, P2, P3) in the case of the minus gear set or that is a ring gear of the respective first, second or third planetary gear set (P1, P2, P3) in the case of the plus gear set, and
a third element (E31, E32, E33) that is the ring gear of the respective planetary gear set in the case of the minus gear set or that is the carrier of the respective first, second or third planetary gear set (P1, P2, P3) in the case of the plus gear set,
wherein the first element (E11) of the first planetary gear set (P1) is permanently rotationally fixedly immobilized,
wherein the second element (E21) of the first planetary gear set (P1) is permanently connected to the input shaft (GW1),
wherein the second element (E22) of the second planetary gear set (P2) is permanently connected to the output shaft (GW2),
wherein the third element (E32) of the second planetary gear set (P2) is rotationally fixedly immobilizable by closing the first shift element (B1),
wherein the third element (E31) of the first planetary gear set (P1) is connectable to the first element (E12) of the second planetary gear set (P2) by closing the fourth shift element (K3),
wherein the third element (E31) of the first planetary gear set (P1) is connectable to the third element (E32) of the second planetary gear set (P2) by closing the fifth shift element (K4),
wherein the third planetary gear set (P3) has a first coupling (V1) and a second coupling (V2), the first coupling (V1) is between the first element (E13) of the third planetary gear set (P3) and the first element (E12) of the second planetary gear set (P2), and the second coupling (V2) is between the third element (E33) of the third planetary gear set (P3) and the output shaft (GW2),
wherein the second element (E23) of the third planetary gear set (P3) is permanently connected to the input shaft (GW1),
wherein one of the first coupling (V1) and the second coupling (V2) is a permanently rotationally conjoint connection and the other one of the first coupling (V1) and the second coupling (V2) is a connection selectable by the third shift element (K2),
wherein, when the first coupling (V1) is the permanently rotationally conjoint connection, a rotationally conjoint connection between two of the first, second and third elements (E13, E23, E33) of the third planetary gear set (P3) is producible by closing the second shift element (K1),
wherein, when the second coupling (V2) is the permanently rotationally conjoint connection, the input shaft (GW1) is connectable to the first element (E12) of the second planetary gear set (P2) by closing the second shift element (K1), and
wherein the third element (E31) of the first planetary gear set (P1) is permanently rotationally conjointly connected to a rotor (R) of an electric motor (EM1).

2. The transmission (G) according to claim 1, wherein
a first forward gear ratio (G1) of the eight selectable forward gear ratios (G1-G8) is realized by closing the first shift element (B1) and the second shift element (K1),
a second forward gear ratio (G2) of the eight selectable forward gear ratios (G1-G8) is realized by closing the first shift element (B1) and the fourth shift element (K3),
a third forward gear ratio (G3) of the eight selectable forward gear ratios (G1-G8) is realized by closing the first shift element (B1) and the third shift element (K2),
a fourth forward gear ratio (G4) of the eight selectable forward gear ratios (G1-G8) is realized by closing the third shift element (K2) and the fourth shift element (K3),
a fifth forward gear ratio (G5) of the eight selectable forward gear ratios (G1-G8) is realized by closing the second shift element (K1) and the third shift element (K2),
a sixth forward gear ratio (G6) of the eight selectable forward gear ratios (G1-G8) is realized by closing the third shift element (K2) and the fifth shift element (K4),
a seventh forward gear ratio (G7) of the eight selectable forward gear ratios (G1-G8) is realized by closing the second shift element (K1) and the fifth shift element (K4), and
an eighth forward gear ratio (G8) of the eight selectable forward gear ratios (G1-G8) is realized by closing the fourth shift element (K3) and the fifth shift element (K4).

3. The transmission (G) according to claim 1, wherein the first shift element (B1) is a dog-clutch shift element.

4. The transmission (G) according to claim 1, further comprising a connecting shaft (AN) connectable by a sixth shift element (K0) to the input shaft (GW1),
wherein the connecting shaft (AN) and the output shaft (GW2) are arranged coaxially with respect to one another,
wherein the connecting shaft (AN) and the output shaft (GW2) are arranged at opposite axial ends of the transmission (G), wherein, proceeding from an axial end of the transmission (G) proximate the connecting shaft (AN), the first, second and third planetary gear sets (P1, P2, P3) are arranged in the following axial sequence: first planetary gear set (P1); second planetary gear set (P2); and third planetary gear set (P3).

5. The transmission (G) according to claim 4, wherein the sixth shift element (K0) is a positively locking shift element.

6. The transmission (G) according to claim 4, wherein the sixth shift element (K0) is a frictionally locking shift element with variable torque transfer capability.

7. The transmission (G) according to claim 1, further comprising a connecting shaft (AN) connectable by a sixth shift element (K0) to the input shaft (GW1),
wherein, proceeding from an axial end of the transmission (G) proximate the connecting shaft (AN), the first, second and third planetary gear sets (P1, P2, P3) are arranged in the following axial sequence: third planetary gear set (P3); second planetary gear set (P2); and first planetary gear set (P1).

8. The transmission (G) according to claim 7, wherein the sixth shift element (K0) is a positively locking shift element.

9. The transmission (G) according to claim 7, wherein the sixth shift element (K0) is a frictionally locking shift element with variable torque transfer capability.

10. The transmission (G) according to claim 1, wherein, when the first coupling (V1) is the permanently rotationally conjoint connection, the first element (E13) of the third planetary gear set (P3) is connectable to the second element (E23) of the third planetary gear set (P3) by closing the second shift element (K1), and the second shift element (K1) is arranged, at least in part, radially within the fourth shift element (K3).

11. The transmission (G) according to claim 1, wherein, when the first coupling (V1) is the permanently rotationally conjoint connection, the second element (E23) of the third planetary gear set (P3) is connectable to the third element (E33) of the third planetary gear set (P3) by closing the second shift element (K1), and the second shift element (K1) is arranged axially between the third planetary gear set (P3) and an axial end of the transmission (G) proximate the output shaft (GW2).

12. The transmission (G) according to claim 1, wherein, when the first coupling (V1) is the permanently rotationally conjoint connection, the first element (E13) of the third planetary gear set (P3) is connectable to the third element (E33) of the third planetary gear set (P3) by closing the second shift element (K1), and the second shift element (K1) is arranged axially between the second planetary gear set (P2) and the third planetary gear set (P3).

13. The transmission (G) according to claim 1, wherein, when the second coupling (V2) is the permanently rotationally conjoint connection, and the second shift element (K1) is arranged, at least in part, radially within the fourth shift element (K3).

14. A hybrid drivetrain for a motor vehicle comprising the transmission (G) according to claim 1.

* * * * *